United States Patent [19]

Gelbein et al.

[11] Patent Number: 5,073,236
[45] Date of Patent: Dec. 17, 1991

[54] PROCESS AND STRUCTURE FOR EFFECTING CATALYTIC REACTIONS IN DISTILLATION STRUCTURE

[76] Inventors: Abraham P. Gelbein, 9412 Benttree Cir., Wichita, Kans. 67226; Matt Buchholz, 250 N. Bluff, Wichita, Kans. 67208

[21] Appl. No.: 434,342

[22] Filed: Nov. 13, 1989

[51] Int. Cl.⁵ .......................... B01D 3/32; B01J 8/04
[52] U.S. Cl. .................................. 203/29; 203/99; 203/DIG. 6; 202/158; 261/112.1; 422/191; 422/193
[58] Field of Search .................... 203/29, DIG. 6, 99, 203/DIG. 16; 202/158; 422/191, 193, 187, 196, 216; 261/112.2, 112.1; 502/527

[56] References Cited

U.S. PATENT DOCUMENTS

| | | | |
|---|---|---|---|
| 2,676,875 | 4/1954 | Barr | 422/191 |
| 3,466,151 | 9/1969 | Sicard et al. | 422/191 |
| 4,213,847 | 7/1980 | Chen | 203/DIG. 6 |
| 4,302,356 | 11/1981 | Smith | 252/426 |
| 4,303,600 | 12/1981 | Roe | 261/112.2 |
| 4,307,254 | 12/1981 | Smith | 568/697 |
| 4,439,350 | 3/1984 | Jones | 502/527 |
| 4,443,559 | 4/1984 | Smith | 502/527 |
| 4,471,154 | 9/1984 | Franklin | 422/193 |
| 4,623,454 | 11/1986 | Tauscher et al. | 261/112.2 |
| 4,731,229 | 3/1988 | Sperandio | 422/191 |
| 4,847,431 | 7/1989 | Nocca et al. | 422/193 |

*Primary Examiner*—Wilbur Bascomb, Jr.

[57] ABSTRACT

A concurrent catalytic reaction with distillation structure involves a plurality of vapor permeable plates which are arranged in spaced apart relationship with a catalyst placed in the open space between two adjacent plates. The catalyst filled area presents a reaction zone where catalytic reaction can take place and the vapor permeable plates present a large surface area for vapor and liquid phase exchange. The invention also encompasses a process for concurrent catalytic reaction with distillation employing structure as aforedescribed and including the steps of feeding a liquid stream to a column employing such structure and directing the stream through the catalytic reaction zone while concurrently distilling a portion of the liquid to present a vapor stream which is directed in countercurrent relationship to the liquid stream flow.

14 Claims, 3 Drawing Sheets

PROCESS AND STRUCTURE FOR EFFECTING CATALYTIC REACTIONS IN DISTILLATION STRUCTURE

BACKGROUND OF THE INVENTION

This invention relates in general to a mass transfer or distillation column and, more particularly, to a structure within the column for concurrently contacting a fluid stream with a particulate solid catalyst while distilling the reaction product.

The use of a catalyst packed distillation column allows concurrent catalytic reaction of a fluid stream flowing through the catalyst and fractionation of the resulting reaction product. The use of solid, particulate catalysts in a conventional fixed bed within such columns generally results in high pressure drop within the column as the low permeability of the catalyst bed impedes the upward flowing vapor and downward flowing liquid. Compaction and breakage of the catalyst in conventional fixed beds inevitably occurs and may further increase the pressure drop or may result in preferential channeling of the fluid streams through areas of high permeability. Portions of the catalyst bed having low permeability are then segregated from the fluid streams and the efficiency of the reaction process is reduced.

In an attempt to reduce the high pressure drop and channeling which may occur within the compact catalyst fixed bed, the particulate catalyst in some columns has been placed into a plurality of pockets within a cloth belt. The belt is then supported by a specially designed support structure such as an open mesh knitted stainless steel wire joined with the cloth belt. U.S. Pat. No. 4,242,530 provides an example of one such structure. While these types of reaction with distillation structures may provide reduced pressure drop and reduced-channeling within the distillation column, they often fail to achieve the distillation performance obtainable with many types of structured packings. Moreover, because the catalyst containers are intimately associated with the support structure, both the catalyst containers and support structure must be dismantled and replaced when the catalyst is spent. This can be a frequent occurrence when catalysts which have a cycle life as short as several months are used and results in significant losses in operating time.

Structured packings are also well known in the art including packings made of sheet material and having configurations for promoting vapor liquid contact. A particularly advantageous structured packing is that shown in U.S. Pat. No. 4,296,050. It has not heretofore been known to combine a structured packing of the type shown in the referenced patent with a fixed catalyst bed in a column where distillation and reaction occur simultaneously.

SUMMARY OF THE INVENTION

It is an object of this invention to provide a method for concurrently catalytically reacting and distilling fluid streams within a column in a manner which allows for improved distillation performance.

It is also an object of this invention to provide a method for utilizing structured packing within a distillation or mass transfer column in combination with an associated catalyst to allow concurrent catalytic reaction and distillation of fluid streams flowing through the column.

It is a further object of this invention to provide a structure within a distillation or mass transfer column which allows concurrent catalytic reaction with distillation of fluid streams flowing through the structure and which allows structured packing to be utilized for greater distillation efficiency.

It is another object of this invention to provide a structure within a column which allows concurrent catalytic reaction with distillation of fluid streams and which allows for reuse of the support structure after the catalyst is spent and removed.

It is yet another object of this invention to provide a structure within a distillation or mass transfer column which allows concurrent catalytic reaction with distillation of fluid streams and which allows for selective installation of the catalyst so that pressure drop through the distillation column may be varied.

To accomplish these and other related objects of the invention, a distillation or mass transfer column is provided with a structure comprising a plurality of corrugated plates and an associated permeable catalyst bed. The corrugated plates are arranged in parallel relationship and present open channels between the plates for the distribution and fractional distillation of fluid streams. The catalyst bed is maintained in at least a portion of the open channels to provide a catalytic reaction zone. In one embodiment of the invention, the catalyst bed is formed by sandwiching a layer of solid, particulate catalyst between pairs of plates. In other embodiments of the invention, the catalyst bed fills at least a portion of the corrugations on one side of the plates and is maintained in association with the plate by a permeable wall member which is coupled to the plate.

In still another embodiment of the invention, the structure comprises a pair of plates constructed of vapor permeable material with pockets configured into the plates and interconnected with one another by passages. The area between the passages and the pockets are joined to one another by welding so as to add rigidity and strength to the structure. Catalyst is inserted within the pockets and passageways formed by the two plates.

The rigid plates formed as above described are arranged in a structured fashion to provide uniform liquid distribution and increased distillation performance. The plates also serve as a support structure for the catalyst bed which forms a reaction zone in at least a portion of the open areas between the two plates. Use of the catalyst bed in conjunction with the plates allows for concurrent catalytic reaction of fluid streams with distillation of the reaction product.

BRIEF DESCRIPTION OF THE DRAWINGS

In the drawings where like reference numerals are used to refer to like parts in the various views.

DESCRIPTION OF THE PREFERRED EMBODIMENT

Figure 1:
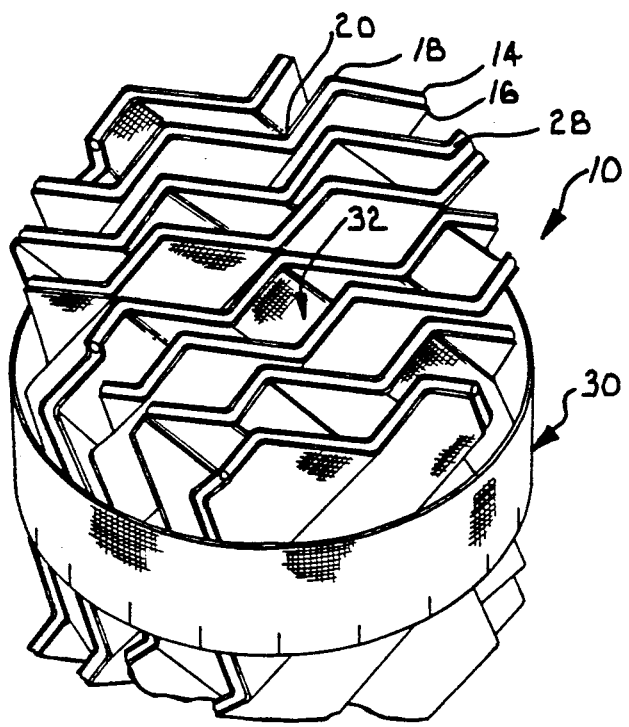
FIG. 1 is a top perspective view of a first embodiment of a reaction with distillation structure.

Referring now to the drawings in greater detail and initially to FIGS. 1-4, one embodiment of a reaction with distillation structure is represented broadly by the numeral 10. Structure 10 is shaped for placement within a cylindrical mass transfer column 12 to allow concurrent catalytic reaction of fluid streams and distillation of the reaction products. Although illustrated as being generally cylindrical in shape, structure 10 may comprise other shapes as needed for large diameter columns or for application with columns of noncylindrical configurations.

Reaction with distillation structure 10 comprises a plurality of pairs of corrugated plates 14 and 16 which are coupled together at their peripheral edges and maintained with their corrugations in parallel alignment. Each plate has alternating ridges 18 and troughs 20 which extend in parallel relationship and are formed by bending the plate or other suitable techniques. Ridges 18 in each plate are preferably of the same amplitude so that they lie in a common plane. Similarly, troughs 20 are preferably of the same amplitude and are co-planar.

Corrugated plates 14 and 16 are formed from vapor and liquid permeable material having sufficient rigidity to maintain the desired corrugated configuration. Preferably, the plates comprise a wire gauze or metal screen material but other types of material such as plastic gauze and ceramics which have the desired characteristics may also be utilized.

Figure 3:
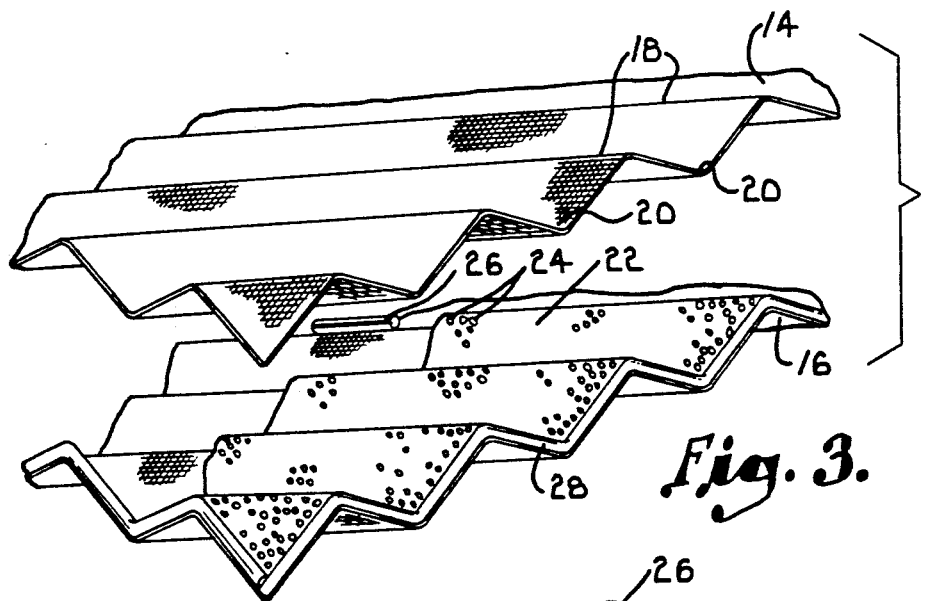
FIG. 3 is a fragmentary exploded view taken in side perspective, of a pair of plates and catalyst bed, shown rotated 90° from the orientation depicted in FIG. 1.
Figure 4:
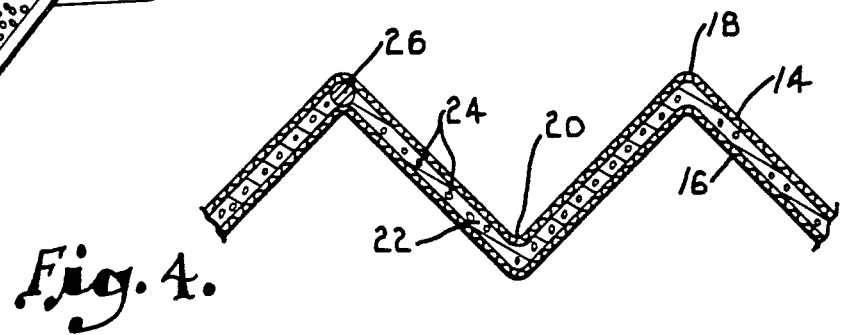
FIG. 4 is a fragmentary end sectional view of the pair of plates and associated catalyst shown in exploded form in FIG. 3.

As best shown in FIGS. 3-4, a catalyst bed 22 is sandwiched between each associated pair of corrugated plates 14 and 16 with the plates forming an enclosing envelope for the catalyst bed. The catalyst bed 22 may comprise any solid particulate catalyst 24 which is suitable for the applicable reaction occurring within the catalyst bed. Catalyst 24 may be an acid or basic catalyst or may comprise catalytic metals and their oxides, halides or other chemically reacted states. Molecular sieves may also be utilized as the catalyst. The catalyst chosen should be heterogeneous with the system reaction and the fluid streams. By way of example, acid cation exchange resins may be used for dimerization, polymerization, etherification, esterification, isomerization, and alkylation reactions. Other catalysts such as molecular sieves, magnesia, chromia, silica, and alumina may be used for isomerization reactions.

The catalyst particles 24 preferably are either a cylindrically shaped extrudate or in the form of small beads or the like. Irregular shaped granules or fragments may also be used. The size of the catalyst particles may be varied depending upon the requirements of the particular applications.

The catalyst bed 22 is formed to a pre-selected uniform thickness between the parallel pairs of plates 14 and 16. The spacing between the plates is maintained by appropriate spacers 26 located at selected positions and tack welded to at least one of each pair of associated plates. The peripheral edges of the plates are sealed together in a suitable manner to maintain the catalyst particles in place. Sealing may be effected by securing one or more elongated sealing members such as solid rods 28 along the entire periphery of both plates and spanning the opening therebetween. Each rod member 28 is preferably rigid to help maintain the shape of plates 14 and 16 while sealing the ends of the area between the plates. The rods are held in rigid relationship to plates 14 and 16 by welding.

Figure 2:
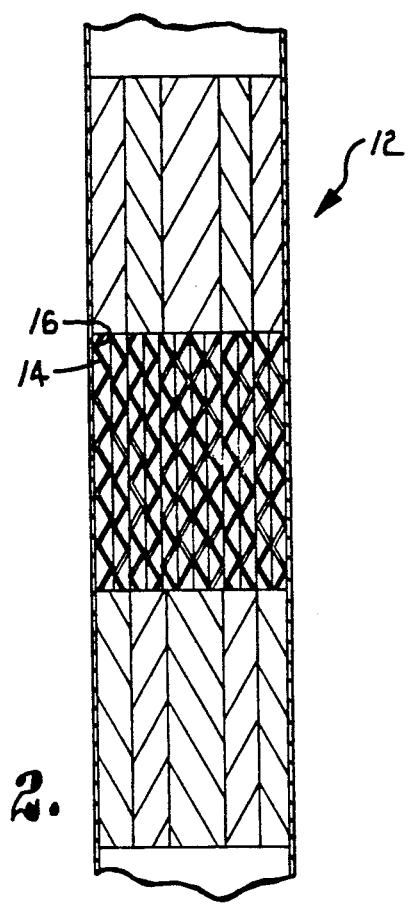
FIG. 2 is a fragmentary, side perspective view of a mass transfer column with portions broken away to illustrate positioning of the reaction with distillation structure shown in FIG. 1 within the column.

A plurality of pairs of the appropriately sized plates 14 and 16 with an associated catalyst bed are placed upright on edge and arranged in facing relationship to form the generally cylindrical structure 10. A band 30 may be used to maintain the plates in the desired configuration. As is apparent from viewing FIGS. 1 and 2, each pair of plates contacts at least one adjoining pair to present a row of contiguous pairs of plates. The pairs of plates are oriented so that the ridges 18 and troughs 20 of each pair of plates are disposed at an angle and in criss-crossing relationship to the ridges and troughs of each adjacent pair of plates. Continuous open channels 32 are thus formed along the troughs between adjacent facing plates to facilitate liquid and vapor passage through the column. It is preferred that the ridges of the plates also extend at an angle to the vertical axis of the column 12 so that fluid streams flow along the channels at angles to the vertical axis of the column. This feature is best illustrated in FIG. 2 where the slanted lines on the upper and lower tower sections represent the ridges of the plates.

The structure 10 operates as a structured packing for fractional distillation of fluid streams and concurrently provides for catalytic reaction of the fluid streams. In a typical installation, a plurality of structures 10 are stacked one on top of the other inside the column on an appropriate support structure. Each vertical row of structures is placed with its plates 14 and 16 parallel to other plates in the same row and at 90° relative to the plane of the plates in a vertically adjacent row. This relative orientation of three vertically spaced rows of plates is illustrated in FIG. 2. The structure 10 has particular applicability with liquid phase reactions having products separable by distillation and counter current gas/liquid contacting in liquid phase heterogeneous catalyst systems. In operation, one or more fluid streams are charged to the column 12 with liquid descending through structure 10 and vapor streams ascending through the structure. The liquid stream flow occurs in channels 32 along the surface of plates 14 and 16 and through the catalyst bed 22. Liquid distributors may be utilized at the upper end of structure 10 to preferentially direct the liquid streams as desired into either the channels 32 or catalyst bed 22.

The catalyst bed 22 forms a catalytic reaction zone for catalytically reacting the descending liquid streams. Concurrently, a vapor phase is formed by fractional distillation of the liquid streams and preferentially flows upwardly through channels 32 for mixing with descending liquid streams. Mass transfer between the liquid and vapor phases occurs primarily on the surfaces of the plates 14 and 16 as well as on the catalyst.

Mixing of the liquid and vapor phases occurs in channels 32 as ascending vapor contacts descending liquid. The liquid phase passes through the permeable plates 14 and 16 from the channels into the catalyst bed 22 for catalytic reaction. The reaction product likewise passes from the catalyst bed into the channels where primary fractional distillation occurs. The quantity of liquid entering the catalyst zone is a function of the permeability of the surfaces of plates 14 and 16 and may also be regulated by directly introducing the liquid streams into the catalyst zone at the top of the structure 10.

A material such as wire mesh is particularly advantageous for constructing devices 10 since this material presents a large surface area that is highly efficient in holding a relatively large amount of the liquid phase which can then engage in mass transfer with the vapor phase passing through the interior of the devices.

It can thus be seen that the structure 10 provides the benefits of a structured packing while allowing concurrent catalytic reaction with distillation of fluid streams. The use of a plurality of pairs of plates 14 and 16 enhances the distillation efficiency of the reaction process and at the same time provides an enclosing envelope for the catalyst bed 22 which forms the catalytic reaction zone. The catalyst bed is maintained in association with the plates in a manner which virtually eliminates undesired channeling of the liquid phase through the bed.

Structure 10 also provides the added benefit of allowing reuse of plates 14 and 16 after the catalyst 24 has been expended. Renewal of the catalyst may be effected by removing the structure 10 from the column and separating the sealing member 28 from each pair of plates 14 and 16 to remove the catalyst bed 22. The plates may then be reused with a new catalyst bed being formed between the plates in a suitable manner. The plates are then reassembled into structure 10 and returned to the column.

Figure 5:
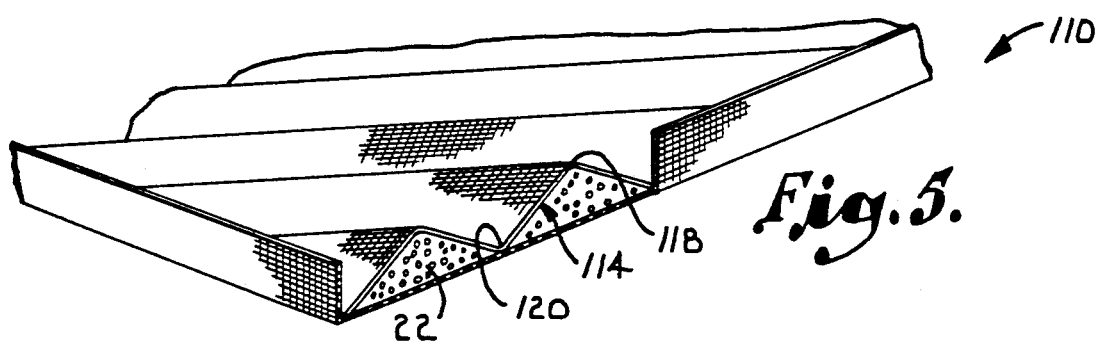
FIG. 5 is a fragmentary side perspective view of a second embodiment of a reaction with distillation structure, with portions of the structure being broken away to show the catalyst bed.
Figure 6:
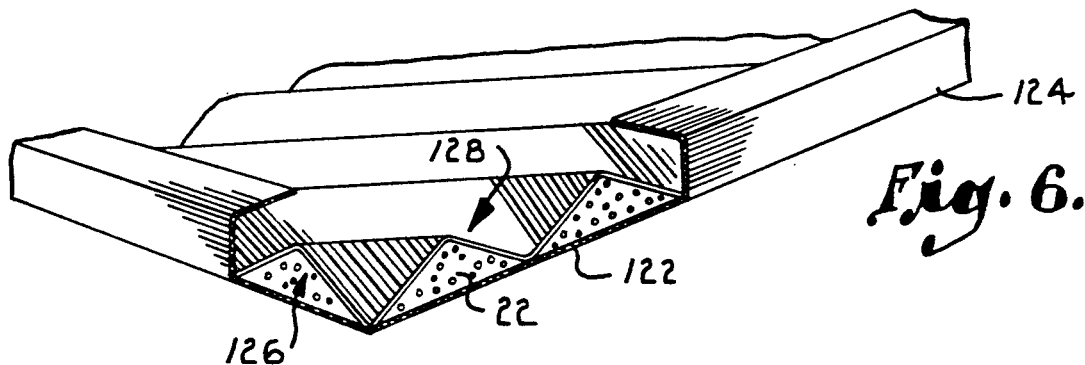
FIG. 6 is a fragmentary side perspective view of a third embodiment of a reaction with distillation structure, with portions of the structure being broken away to show the catalyst bed.

Turning now to FIG. 5, an alternate embodiment 110 of a reaction with distillation structure will be described. Structure 110 comprises a corrugated plate 114 having alternating ridges and troughs 118 and 120, respectively, which extend in parallel relationship to each other. Construction of plate 114 is identical to construction to one of the plates 14 or 16 previously described for the preferred embodiment. A planar wall member 122 is disposed on one side of plate 114 with side edges 124 extending in an L-shaped configuration from the planar surface of the member so as to wrap around plate 114. Wall member 122 is preferably formed from a woven material such as aluminum, steel or other wire mesh; nylon, Teflon and other plastic materials; or cloth material such as cotton, fiberglass, polyester and the like. Member 122 is preferably sized to completely cover one side of plate 114 and a catalyst bed 22 as previously described for the preferred embodiment is located between member 122 and plate 114. The side edges of member 122 can be tack welded, rivetted or otherwise rigidly secured to the side of plate 114 which is opposite the planar surface of the member so as to provide a unitary rigid construction.

Member 122 and plate 114 cooperate to provide a plurality of enclosing, permeable envelopes 126 of triangular cross-section with two sides of the envelope being presented by the corrugated plate and the third side being presented by planar member 122. The edge portion of member 122 which extends at a 90° angle to the main planar surface of the member presents a wall for closing off the ends of each envelope 126.

A plurality of plates 114 with catalyst in place are arranged in a manner previously described for structure 10. That is, a plurality of structures 110 are positioned in side-by-side parallel relationship with the ridges and troughs of one row of structures being rotated 90° relative to the plane of the structures on the next vertically adjoining row. The corrugated plates provide liquid flow channels 128 along the troughs 120 on the surface of the plate opposite catalyst bed 22. The liquid will, of course, extend over a substantial portion of the woven surface of the plate for mass transfer with the vapor phase. Also, some liquid stream may pass through the catalyst bed 22. Catalyst bed 22 forms a catalytic reaction zone for reacting the descending liquid streams. The vapor phase formed by fractional distillation of the liquid streams will flow upward through the catalyst as well as through channels 128 for interaction with the liquid streams including mass transfer.

During process operations, the liquid phase of the fluid streams flows through catalyst beds 22. As the catalyst bed becomes saturated, the catalytically reacted products weep from the catalyst zone through the permeable plates 114 and wall member 122 for mass transfer in open channels 128. The vapor phase primarily flows through open channels 128 and mass transfer between the liquid and the vapor phases occurs. Some distillation may also occur within the catalyst bed 22 with the vapor phase which passes through the permeable plates 114 and wall member 120.

Enclosing of the catalyst bed 22 in the envelopes presented by plate 114 and wall member 122 permits the desired distillation efficiency while accommodating reuse of the plates 114. After the catalyst has been expended, structure 110 is removed from the column and one end of the enclosing envelopes is opened to allow the catalyst to be removed. The plate may then be inverted and new catalyst added through the same opening.

Another alternative form of the invention is illustrated in FIGS. 7-11. This alternative form of the invention is designated generally by the numeral 210 and comprises a plurality of pairs of rigid plates 214 and 216. Each of the plates 214 and 216 is identical and, accordingly, only one will be described in detail. Plate 214 is provided with a plurality of spaced apart concave sections 230 each of which has a truncated pyramid shape with sloping sidewalls 230a that converge on a planar bottom 230b. The plate 214 also has a plurality of second concave sections 232 which are of semicylindrical shape and extend between adjacent sections 230. Plates 214 and 216 are preferably made from a vapor/liquid permeable material such as wire mesh, although other alternative materials as discussed in conjunction with the preferred embodiment may also be utilized.

Figure 9:
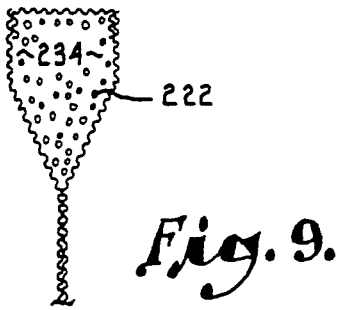
FIG. 9 is a vertical cross-sectional view taken along line 9—9 of FIG. 7.
Figure 11:
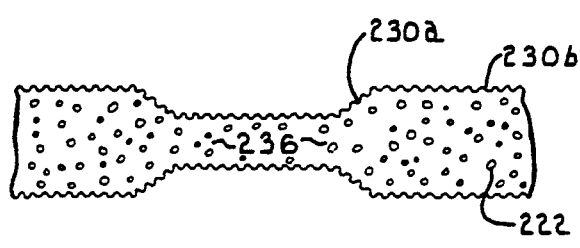
FIG. 11 is a cross-sectional view taken along line 11—11 of FIG. 7.
Figure 10:
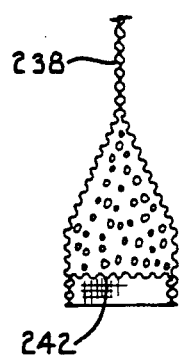
FIG. 10 is a vertical cross-sectional view taken along line 10—10 of FIG. 7.

When two plates 214 and 216 are disposed in facing relationship, the concave sections 230 and 232 are aligned so as to present first and second open areas 234 and 236 as illustrated in FIGS. 9 and 11. The flat areas 238 of plate 214, which areas comprise the remainder of the plate surface not occupied by concave sections 230 and 232, are placed in contact with the corresponding area of a facing plate. These flat areas may be spot welded or otherwise connected to hold the two plates in rigid relationship thus adding considerable strength to the assembled pair of plates.

The sections 230 at the end of plate 214 are further truncated along a plane lying perpendicular to the plane of the plate and when the two plates 214 and 216 are joined together in facing relationship end caps 240 close off the open areas at the terminal plate ends. The end cap 240 is made of the same material as plates 214 and 216. Cap 240 is flush with the ends of the assembled pair of plates.

A second end cap 242 (FIG. 10) is used to close off the open areas at the ends of the assembled plates which are opposite the ends where caps 240 are employed. It is to be noted that end caps 242, which are made from the same material as plate 214, are spaced inwardly from the terminal ends of the two adjoining plates.

Figure 7:
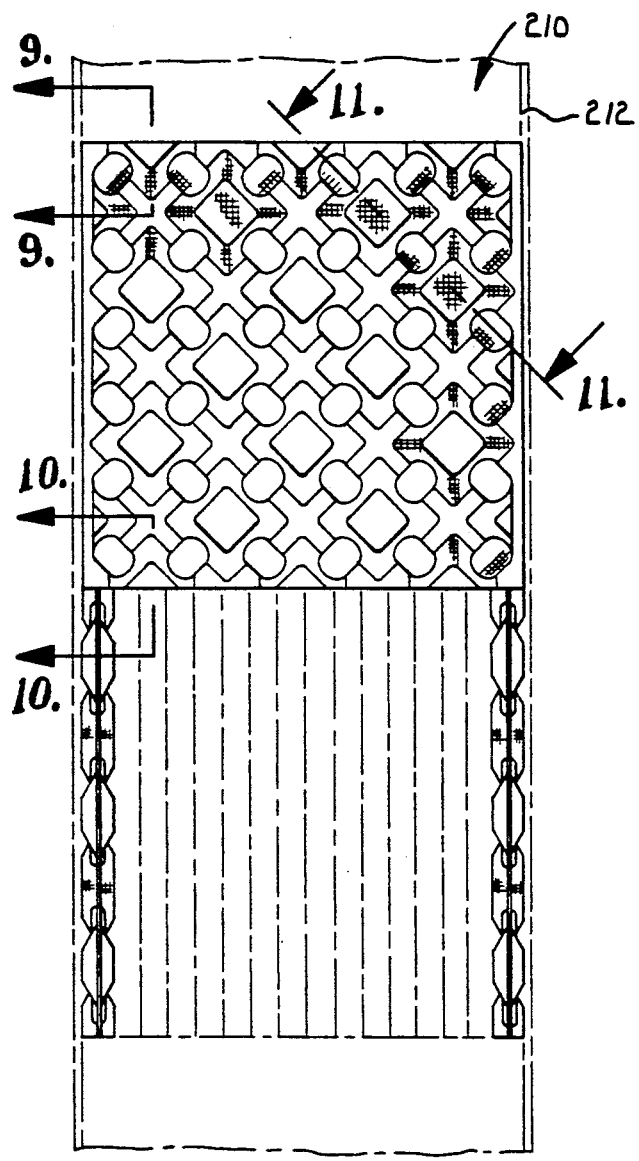
FIG. 7 is a fragmentary side perspective view of a mass transfer column with portions broken away to illustrate positioning of an alternative form of reaction with distillation structure according to the present invention.
Figure 8:
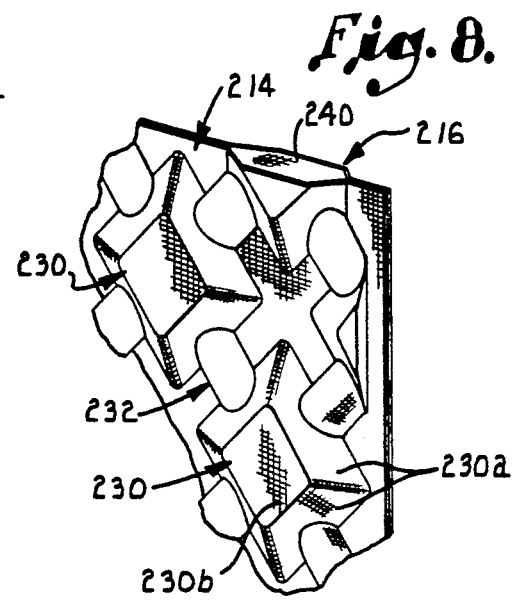
FIG. 8 is a fragmentary perspective view of two of the plates used to form a reaction with distillation structure in the alternative embodiment of FIG. 7.

In use, the open areas of structure 210 are filled with particulate catalyst material, various alternatives for which are discussed in conjunction with the preferred embodiment. Once the catalyst is loaded into the plates and the respective end caps secured, the plates are arranged in rows within column 212 as shown in FIG. 7 and as described in conjunction with the preferred embodiment. Also, as discussed in conjunction with the preferred embodiment, each vertical row of plates is preferably oriented at 90° relative to the vertical planes of the plates in an adjacent row.

Operation of a column with structure 210 in place for effecting concurrent catalytic reaction with distillation is similar to the operation previously described for the preferred embodiment. One or more fluid streams are charged to the column 212 with liquid descending through structure 210 and vapor ascending. Liquid will flow through the catalyst bed 222 and will ultimately reach the surface of plates 214 and 216 where it will undergo mass transfer with vapor which will preferentially be directed upwardly through the column following the channels presented by the spaces between the first concave sections 214 of each plate. In this regard, it is to be noted that the concave depth of sections 232 is only approximately one-half the depth of sections 230 so that, when two plates are in side-by-side touching relationship with the concave sections in back-to-back relationship, there will be a clear flow path for the vapor over the second concave sections 232 and between sections 230 of adjoining plates.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A reaction and distillation structure comprising:
a plurality of vertically extending vapor permeable plates disposed in closely spaced adjacent pairs,
at least one plate of each pair presenting a plurality of catalyst receiving areas while the other plate off the pair cooperates with the first-mentioned plate to retain catalyst in said areas;
a particulate catalyst substantially filling at least some of said areas; and
means coupled with each pair of plates to cooperate with the latter and present a catalyst enclosing envelope to retain said catalyst in said areas,
each adjacent pair of plates being in contact with at lest one adjoining pair to present a plurality of contiguous pairs of said plates.

2. A reaction with distillation structure as set forth in claim 1, wherein said plates are of a corrugated configuration; means for holding said plates in spaced apart relationship to present said areas, the latter comprising a plurality of intersecting planar areas parallel to the planes of said corrugations.

3. A reaction with distillation structure as set forth in claim 1, wherein one of said plates is corrugated and the other of said plates comprises a member presenting a substantially planar surface in contact with the corrugations of said first plate to present a plurality of said areas each having a triangular cross-section.

4. A reaction with distillation structure as set forth in claim 1, wherein each of said plates is characterized by a plurality of spaced apart first concave sections, said first sections being aligned when said plates are facing to present some of said open areas, said plates being further characterized by a plurality of second concave sections, said second sections being aligned when said plates are facing to provide area passageways connecting the areas presented by said first sections.

5. A reaction with distillation structure as set forth in claim 1, wherein said plates are liquid permeable.

6. A mass transfer column having a catalytic with distillation structure, said column comprising:
means for presenting an elongated upright tower into which reactants can be introduced at varying vertical heights;
a plurality of vertically extending vapor permeable plates disposed in closely spaced adjacent pairs.
at least one plate of each pair presenting a plurality of catalyst receiving areas while the other plate of the pair cooperates with the first-mentioned plate to retain catalyst in said areas;
a particulate catalyst substantially filling at least some of said areas; and
means coupled with each pair of plates to cooperate with the latter and present a catalyst enclosing envelope to retain said catalyst in said areas,
each adjacent pair of plates being in contact with at least one adjoining pair to present a plurality of contiguous pairs of said plates extending in a horizontal plane across said tower,
there being a plurality of vertically spaced rows of said contiguous pairs of plates in said tower.

7. A reaction with distillation structure as set forth in claim 6, wherein said plates are of a corrugated configuration; means for holding said plates in spaced apart relationship to present said areas, the latter comprising a plurality of interacting planar areas parallel to the planes of said corrugations.

8. A reaction with distillation structure as set forth in claim 6, wherein one of said plates is corrugated and the other of said plates comprises a member presenting a substantially planar surface in contact with the corrugation ridges of said first plate to present a plurality of said areas each having a triangular cross-section.

9. A reaction with distillation structure as set forth in claim 6, wherein each of said plates is characterized by a plurality of spaced apart first concave sections, said first sections being aligned when said plates are facing each other to present some of said open areas, said plates being further characterized by a plurality of second concave sections, said second sections being aligned when said plates are facing each other to present area passageways connecting the areas presented by said first sections.

10. A reaction with distillation structure as set forth in claim 6, wherein said plates are liquid permeable.

11. A process for concurrent catalytic reaction with distillation of fluid streams within a mass transfer column, said process comprising the steps of:

directing a liquid stream over a plurality of pairs of vertically extending vapor permeable plates disposed in closely spaced adjacent pairs, said plurality of plates presenting mass transfer zones for liquid-vapor interaction, at least one plate of each pair presenting a plurality of catalyst receiving areas while the other plate of the pair cooperates with the firstmentioned plate to retain catalyst in said areas, a particulate catalyst substantially filling at least some of said areas and being retained in an enclosing envelope presented by said plates, each adjacent pair of plates being in contact with at least one adjoining pair to present a plurality of contiguous pairs of said plates;

moving said liquid stream through said particulate catalyst to effect a catalytic reaction;

concurrently distilling a portion of the liquid stream in said column to present a vapor stream;

directing the vapor stream and said liquid stream to said mass transfer zones for interaction; and withdrawing distillation products from said zones and reaction products from said areas.

12. The process of claim 11 wherein the step of directing said liquid stream includes directing it over pairs of plates of a corrugated configuration which are held in spaced apart relationship to present a plurality of intersecting planar open areas which open areas are parallel to the plane of said corrugations.

13. The process of claim 11 wherein said step of directing said liquid stream includes directing it over pairs of plates with one plate of each pair being of a corrugated configuration and the other plate of each pair being substantially planar and in contact with the corrugations of said first plate to present a plurality of said catalyst receiving areas of triangular cross-section.

14. The process of claim 11 wherein said step of directing said liquid stream includes directing it over pairs of plates each having a plurality of spaced apart first concave sections which are aligned with and face corresponding first concave sections on an adjacent plate and which plates further have a plurality of second concave sections which are aligned with and face corresponding second concave sections on an adjacent plate, the second concave areas providing aligned passageways connecting the areas presented by said first sections.

* * * * *